United States Patent
Cawley

(10) Patent No.: US 9,672,015 B2
(45) Date of Patent: Jun. 6, 2017

(54) AUTOMATIC DETERMINATION OF COMPILER CONFIGURATION

(71) Applicant: SEMMLE LIMITED, Oxford (GB)

(72) Inventor: Peter Cawley, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/869,334

(22) Filed: Sep. 29, 2015

(65) Prior Publication Data

US 2017/0090885 A1  Mar. 30, 2017

Related U.S. Application Data

(63) Continuation of application No. 14/867,969, filed on Sep. 28, 2015.

(51) Int. Cl.
*G06F 9/45* (2006.01)
*G06F 9/44* (2006.01)

(52) U.S. Cl.
CPC .......... *G06F 8/37* (2013.01); *G06F 8/41* (2013.01); *G06F 8/423* (2013.01); *G06F 8/433* (2013.01); *G06F 8/48* (2013.01)

(58) Field of Classification Search
CPC .............. G06F 8/30–8/54; G06F 9/455–9/46
See application file for complete search history.

(56) References Cited

U.S. PATENT DOCUMENTS 5,960,202 A * 9/1999 Granston .................. G06F 8/41
717/141
5,966,538 A 10/1999 Granston et al.
6,131,188 A * 10/2000 Goebel .................... G06F 8/447
712/228
6,135,650 A * 10/2000 Goebel .................... G06F 8/447
717/143
6,141,636 A 10/2000 Sarno et al.
(Continued)

OTHER PUBLICATIONS

Chiu, Geng-Ming et al., "A Secure Test Wrapper Design Against Internal and Boundary Scan Attacks for Embedded Cores", 2012, pp. 126-134.*

(Continued)

*Primary Examiner* — Thuy Dao
*Assistant Examiner* — Christopher Franco
(74) *Attorney, Agent, or Firm* — Fish & Richardson P.C.

(57) ABSTRACT

Methods, systems, and apparatus, including computer programs encoded on computer storage media, for automatically determining configuration properties of a compiler. One of the methods includes determining that an executable of the newly created process is a compiler called by the build system to compile source code of a source code file. In response to the determining, a plurality of configuration properties of the compiler called by the build system are determined, the configuration properties including first properties of a plurality of built-in functions of the compiler, second properties of a plurality of built-in types of the compiler, or both. A compiler emulator is configured to emulate the behavior of the compiler called by the build system using the determined configuration properties. Access to the source code is provided to the compiler emulator configured using the determined configuration properties.

24 Claims, 7 Drawing Sheets

(56) References Cited

U.S. PATENT DOCUMENTS

| | | | | |
|---|---|---|---|---|
| 7,290,250 | B2* | 10/2007 | Shinn | G06F 8/41 717/130 |
| 7,340,726 | B1 | 3/2008 | Chelf et al. | |
| 7,788,652 | B2* | 8/2010 | Plesko | G06F 8/437 717/116 |
| 8,533,695 | B2* | 9/2013 | Harvey | G06F 8/437 717/116 |
| 8,612,951 | B2 | 12/2013 | Arnold | |
| 8,762,974 | B1 | 6/2014 | Smith et al. | |
| 9,110,737 | B1 | 8/2015 | Tibble et al. | |
| 2004/0194117 | A1* | 9/2004 | Schulte | G06F 8/437 719/328 |
| 2007/0055963 | A1 | 3/2007 | Waddington et al. | |
| 2012/0011513 | A1 | 1/2012 | McConaughy et al. | |
| 2012/0079465 | A1* | 3/2012 | Harvey | G06F 8/437 717/146 |
| 2014/0258997 | A1 | 9/2014 | Lim et al. | |
| 2015/0088286 | A1* | 3/2015 | Ruth | G06F 8/35 700/86 |

OTHER PUBLICATIONS

Das, Amitabh et al., "PUF-based Secure Test Wrapper Design for Cryptographic SoC Testing", 2012, pp. 1-4.*
Xie, Tao et al., "A Framework and Tool Supports for Generating Test Inputs of AspectJ Programs", 2006, pp. 190-201.*
Huang, Rei-Fu et al., "A Testability-Driven Optimizer and Wrapper Generator for Embedded Memories", 2003, pp. 1-4.*
Morisset, Robin et al., "Compiler Testing via a Theory of Sound Optimisations in the C11/C++11 Memory Model", 2013, pp. 187-196.*
Doucet, Frederic et al., "An Environment for Dynamic Component Composition for Efficient Co-Design", 2002, pp. 1-8.*
European Extended Search Report for Application No. 16191068.2, dated Feb. 23, 2017, 10 pages.
European Extended Search Report for Application No. 16191070.8, dated Feb. 23, 2017, 8 pages.

* cited by examiner

AUTOMATIC DETERMINATION OF COMPILER CONFIGURATION

CROSS-REFERENCE TO RELATED APPLICATIONS

This application is a continuation of and claims the benefit of priority to pending U.S. application Ser. No. 14/867,969, filed Sep. 28, 2015, entitled "Automatic Determination Of Compiler Configuration". The disclosure of the foregoing application is incorporated herein by reference in its entirety.

BACKGROUND

This specification relates to emulating source code compilers.

Emulating compilers has a number of useful applications one of which is static analysis of source code. Static analysis refers to techniques for analyzing computer software source code without executing the source code as a computer software program.

Source code in a code base is typically compiled in a build environment containing a build system. The build environment includes an operating system; a file system; executable files, e.g., compilers; environment variables, e.g., variables that indicate a path to file system directories that contain library files or executable files; and other configuration files for building source code in the code base.

Many compilers have a preprocessor that runs before the compiler is called. Preprocessors can make arbitrary textual substitutions in existing source code files before the compiler is called to compile the modified source code. Preprocessors can also generate temporary source code files that are compiled but then deleted by the build system when compilation is complete.

The behavior of most compilers is significantly influenced by configuration properties of the compilers. Configuration properties of a compiler include both extrinsic configuration properties, e.g., command line flags passed to the compiler by a build system, as well as inherent configuration properties of the compiler version. Inherent configuration properties of a compiler include built-in search paths, built-in types, built-in macros, and built-in functions, all of which influence the behavior of a compiler and all of which can vary by compiler version and by underlying operating system. In addition, extrinsic configuration properties like command line flags can alter inherent configuration properties of the compiler, e.g., built-in search paths.

Despite detailed language specifications of modern source code languages, there still exist many valid source code constructs whose implementation is defined by and specific to the compiler being used. For example, the C++ standard specifies that a preprocessing directive of the form:
include <h-char-sequence> new-line
directs a compiler to search for a sequence of locations for a header identified by the characters within the < and > delimiters. The sequence of locations that the compiler will search are implementation-specific. Thus, different C++ compilers may search for the identified header in different places, which can result in different header definitions being imported into the code during compilation.

As another example, the behavior of some preprocessing directives depends on the state of the preprocessor, e.g., whether or not the preprocessor has a particular built-in macro. For example, in the following example segment of source code, both the type of the variable "x" and its initial value depend on whether or not the preprocessor of the compiler being used has the built-in macro "_MSC_VER":
ifdef _MSC_VER
    int x=1;
else
    float x=2;
endif In some situations source code will compile for some compilers but not for others. This is the case when source code calls a built-in function that is defined by one compiler but not by another. For example, the following source code will typically compile for compilers that have the function "_builtin_bswap64" defined, e.g., GCC, but will fail for compilers that do not, e.g., Microsoft Visual C++:
x=_builtin_bswap64(x)

SUMMARY

This specification describes a system that can automatically determine the configuration properties of compilers used by a build system in order to closely mimic the behavior of the compilers. The system can automatically determine all of the compilers used by a build system and their corresponding configuration properties. The system can then emulate the behavior of the build system by configuring a compiler emulator with the automatically determined configuration properties.

Particular embodiments of the subject matter described in this specification can be implemented so as to realize one or more of the following advantages. A system can automatically determine the configuration properties of any compiler used by a build system. The system can closely mimic the behavior of compilers used by the build system by very precisely configuring a compiler emulator using the automatically determined configuration properties. The system can distinguish between compilers of the build system and non-compiler-executables that are merely thin wrappers around actual compilers. The system can closely mimic the behavior of the build system without modifying the build system. As a static analysis system can more closely mimic the behavior of build system compilers, the more accurate and valuable the static analysis results become. A system can perform live classification of compilers as the build process is happening, which allows the system to access to all source code seen by compilers in the build system, including in particular source code that only exists at the time that it is compiled.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
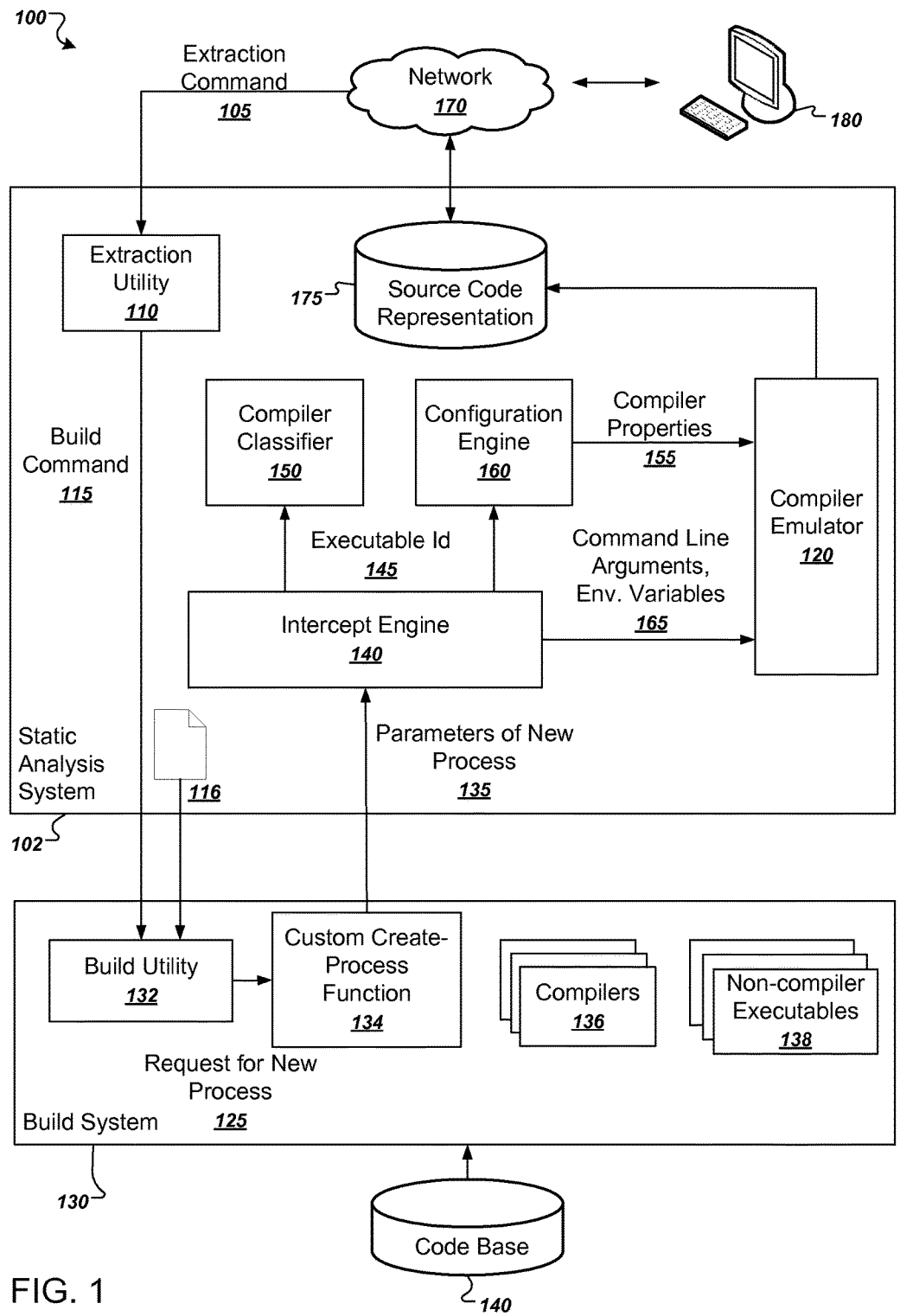
FIG. 1 illustrates an example system.

FIG. 1 illustrates an example system 100. The system 100 is an example of a system that can be implemented to automatically determine compilers in a build system 130 and to automatically determine the configuration properties of the compilers in the build system 130. The example system 100 utilizes a static analysis system 102. However, other appropriate systems that do not perform static analysis of source code can also perform the techniques described below.

The system 100 includes a user device 180 in communication with the static analysis system 102 over a network, 170, which can be any appropriate communications network. The static analysis system 102 includes an extraction utility 110, a compiler emulator 120, an intercept engine 140, a compiler classifier 150, and a configuration engine 160. The components of the static analysis system 102 can be implemented as computer programs installed on one or more computers in one or more locations that are coupled to each other through one or more networks. Alternatively, the static analysis system 102 can be installed in whole or in part on a single computing device, e.g., the user device 180.

The static analysis system 102 is in communication with a build system 130. The static analysis system 102 and the build system 130 can be installed on different computing devices that are in communication with one another, e.g., using the network 170, or the static analysis system 102 and the build system 130 can be installed on a same computing device.

The build system 130 generally builds source code in a code base 140. The build system 130 includes a build utility 132, which can be a conventional component for building and compiling source code. For example, the build utility 132 can be the "make" utility, for Linux and Unix systems, or the build utility 132 can be a batch script that coordinates compiling of source code in the code base 140. Alternatively, the build utility 132 can be an application, or a suite of applications, of an integrated development environment (IDE).

The build system 130 also includes one or more compilers 136 and one or more non-compiler executables 138. The compilers 136 can be any appropriate compiler for compiling source code in the code base 140. For example, one of the compilers 136 can be the gcc compiler. (The gcc compiler is available from the Free Software Foundation, of Boston, Mass.) The build system 130 may also have multiple different compilers 136 for compiling source code in different languages of the code base 140, for compiling source code in different modes, or for compiling source code for different target architectures.

The non-compiler executables 138 include any other executables of the build system 132 that the build utility 132 invokes during the build process. The non-compiler executables 138 can include, for example, file system utilities, source code preprocessors, shell programs invoked by a user, and thin wrappers that call actual compilers.

The static analysis system 102 provides a process interception library 116 to the build system 130. The process interception library 116 will be loaded by new processes on the build system 130 that are created during the build process. Loading the process interception library 116 by the build utility 132 of the build system 130 has two effects. The first effect is that every new process invoked by the build utility 132 in the build system 130 will also load the process interception library 116. The second effect is that every new process invoked by the build system 130 will have its default process creation functions preempted by custom process creation functions defined in the process interception library 116.

In operation, a user of the user device 180 can provide an extraction command 105 to the extraction utility 110 of the static analysis system 102. The extraction command 105 is a request to extract precisely the source code that the compilers 136 of the build system 130 have access to during the build process.

The extraction utility 110 provides a build command 115 to the build system 130. The build command 115 causes the build system 130 to load the process interception library 116 and to execute the build utility 132 to start the build of source code in the code base 140.

In performing the build, the build utility 132 will invoke new processes, which will each be intercepted by the custom create-process function 134. Example methods for intercepting calls to new processes are described in commonly owned U.S. patent application Ser. No. 14/292,691, for "Extracting Source Code," which is incorporated here by reference.

In general, a process is an independent execution unit that contains its own state information, uses its own address space, and only interacts with other processes by interprocess communication mechanisms, which are generally managed by an operating system. A process may include one or more threads, which are also independent execution units but which share the state information and address space of the process. A system can invoke a new process by allocating memory for the new process, loading an executable process image and one or more libraries into the memory allocated for the new process, and scheduling a new thread in the new process for execution.

In this specification, reference may be made to preempting or overriding "create-process" functions of particular operating systems. Preempting or overriding a create-process function means that instead of the call to the create-process function being received and handled by an underlying operating system of the build system 130, the call is received by a custom create-process function 134 that is provided by the static analysis system 102.

The custom create-process function 134 intercepts the call to create a new process and can provide parameters of the new process 135 to the intercept engine 140 of the static analysis system. Example parameters 135 that the custom create-process function 134 can provide to the static analysis system 102 include a name of an executable file to be run in the new process, a file system path to a target of the executable file, command line options of the call to the new process, and environment variables of the runtime environment of the new process.

For example, the new process can be invoked by the following command issued by the build utility 132:

/usr/bin/gcc-lm/usr/src/foo.c

The custom create-process function 134 can then provide, to the intercept engine 140 of the static analysis system 102, the name of the executable file, "/usr/bin/gcc," the command line arguments "-lm" and "/usr/src/foo.c," and the environment variables that the command was issued with.

In general, the static analysis system 102 can preempt or override any appropriate operating system function that handles creating, initializing, modifying, or executing a new process that is being invoked. Thus, a "create-process" function need not actually allocate memory for creating a new process. For example, one appropriate default createprocess function is execve on Linux, which typically loads a new process image into an existing process that was actually created by the fork command. Another appropriate default create-process function is CreateProcess on Microsoft Windows, which does allocate memory in order to invoke a new process.

Thus, when the build utility 132 receives the build command 115, the build utility 132 makes an operating system request 125 to create a new process. The request 125 is intercepted by the custom create-process function 134 that was provided as part of the process interception library 116. The custom create-process function 134 then provides parameters of the new process 135 back to the intercept engine 140 of the static analysis system 102. Typically the custom create-process function then calls the system create-process function to allows the build process to proceed as if it were not being intercepted.

The intercept engine 140 receives the parameters of the new process 135 and determines whether or not the request for the new process 125 is a call to a compiler. If so, the intercept engine 140 will pass the command line arguments and environment variables 165 to a compiler emulator 120. The compiler emulator 120 receives the command line arguments and environment variables 165 and uses them to access source that the compiler was invoked to compile. The compiler emulator 120 can then uses compiler configuration properties 155 of the compiler that was invoked to generate a representation 175 of the source code 165 that accurately reflects how the source code would have been treated by the compiler.

The static analysis system 102 will first determine the precise configuration of the compiler being called. The system 102 will then use the configuration to configure the compiler emulator 120.

The intercept engine 140 first uses a compiler classifier 150 to determine whether or not the executable of the request for the new process 125 is a compiler or some other non-compiler executable. To do so, the intercept engine 140 provides the executable ID 135 of the new process executable to a compiler classifier 150. The compiler classifier 150 determines whether or not the executable of the new process is a compiler or not a compiler.

If the new process is a compiler, the intercept engine 140 provides the executable ID 135 of the compiler to a configuration engine 160. The configuration engine 160 then performs a series of operations to automatically determine the precise configuration properties 155 of the compiler identified by the executable ID 135. The configuration engine 160 configures the compiler emulator 120 using the determined compiler configuration properties 155.

After the compiler emulator 120 has been configured, the intercept engine 140 provides the command line arguments and environment variables 165 to the compiler emulator 120. The compiler emulator 120 then generates a source code representation 175 of the source code file that was originally passed in the request 125.

By intercepting calls to new processes invoked by the build system 130, the static analysis system 102 can perform live compiler classification, i.e. classification as the build is progressing. Live compiler classification is important because the build system 130 may create, move, or delete source code files during the build process. Thus, after the compiler exits, it may no longer be possible to provide the source code that was compiled to the compiler emulator. This can cause the static analysis of the source code to be incomplete.

The generated compiler configuration properties 155 will cause the compiler emulator 120 to emulate the behavior of the compiler very closely. The generated source code representation 175 will then correspond to the representation that would have been generated by the compiler in the request of the new process 125.

Figure 2:
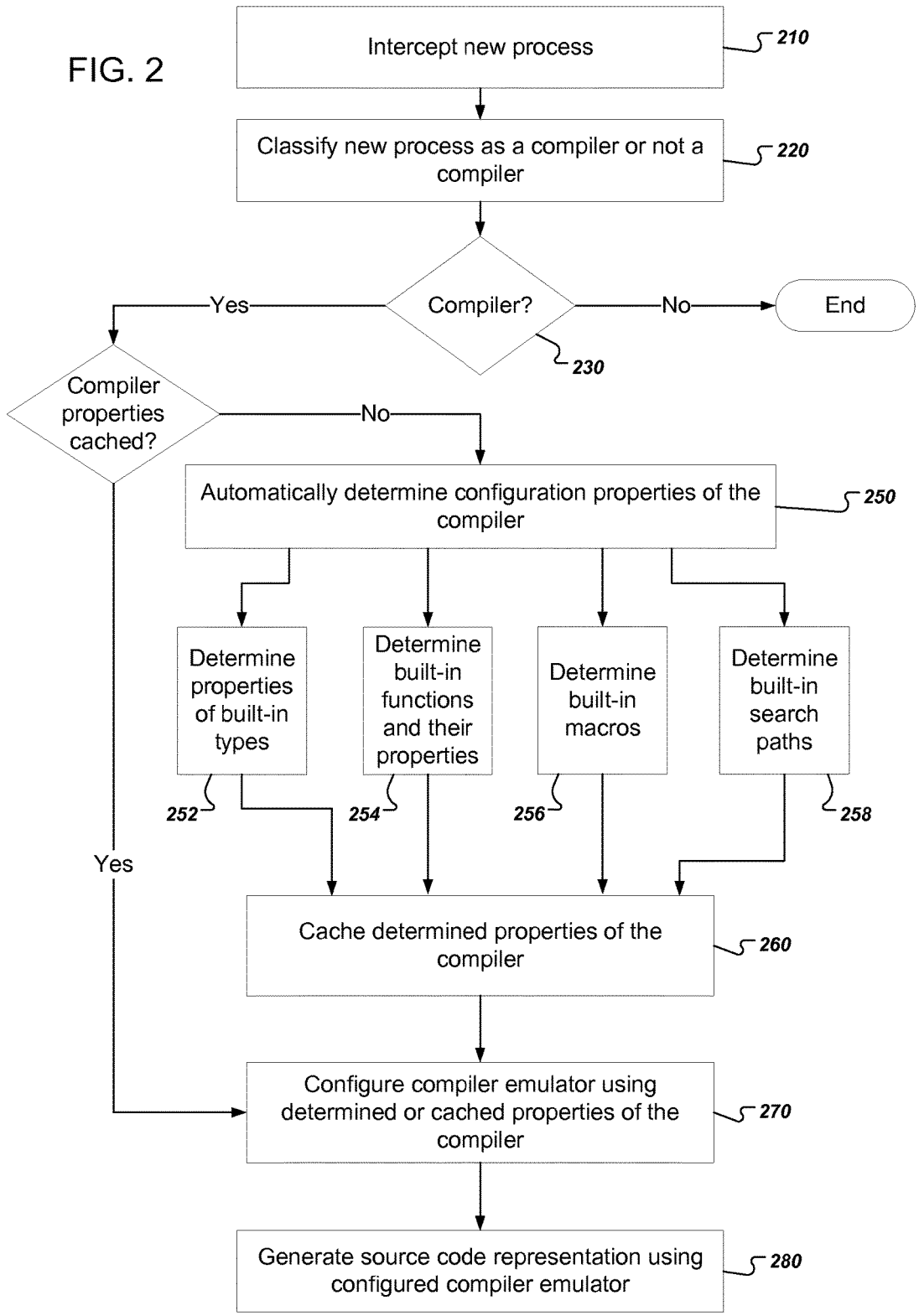
FIG. 2 is a flow chart of an example process for automatically configuring a compiler emulator.

FIG. 2 is a flowchart of an example process for automatically configuring a compiler emulator. In general, a static analysis system first classifies a newly intercepted process as being a compiler or not a compiler. If the process is a compiler, the static analysis system automatically determines configuration properties of the compiler and uses the generated configuration properties to configure a compiler emulator. The process will be described as being performed by an appropriately programmed system of one or more computers, e.g., the static analysis system 102 of FIG. 1.

The system intercepts a new process (210). As described above with respect to FIG. 1, the system can use a process interception library to intercept each newly created process.

The system classifies the new process as a compiler or not a compiler (220). Classifying a new process as a compiler or not a compiler will be described in more detail below with reference to FIG. 3.

If the new process is not a compiler (branch to end), the process ends. The static analysis system typically ensures that intercepting new function calls is transparent to the build system. Thus, after the process ends, the new process that was intercepted is invoked just as it would have been invoked had it not been intercepted.

If the new processes is a compiler (branch to 240), the system determines whether the compiler configuration is cached (250). A static analysis system need not determine the configuration properties of the compiler each time the compiler is invoked by the build system. Rather, once the build system has automatically determined the configuration properties of the compiler, the static analysis system can cache the configuration properties and use the cached configuration properties the next time that the compiler is invoked.

If the compiler configuration properties are not cached, the system automatically determines the configuration properties of the compiler (branch to 250). In general, the system performs a variety of test procedures on an executable file that has been classified as a compiler in order to determine the configuration properties of the compiler. The system can perform the test procedures in any appropriate order and in parallel.

The system determines properties of built-in types (252). To determine properties of built-in types of the compiler, the system can provide, as input to the compiler, source code that directly or indirectly determines one or more properties of one or more built-in types. The system can then examine the output of the compiler to determine the properties of the built-in types. Determining properties of built-in types will be described in more detail below with reference to FIG. 5.

The system determines built-in functions and their properties (254). The system can invoke the executable with source code that intentionally uses invalid arguments for built-in functions, which causes a compiler to output information about the properties of the built-in functions. Determining the properties of built-in functions will be described in more detail below with reference to FIG. 6.

The system determines built-in macros (256). Many compilers emit their built-in macros when passed particular command-line arguments. For example, for gcc, g++, and clang, command line arguments "-E" and "-dM" cause the compiler to print out the built-in macros. For icc, "-E", "-Wp,--list_macros" has the same effect. The system can then parse the output to automatically determine the built-in macros for each compiler.

The system determines built-in search paths (258). The system can compile a simple file with command line arguments "-v" and "-fsyntax-only," the file containing the following code:

include <stddef.h>

This causes most compilers to emit its built-in search paths. The system can then parse the output of the compiler to automatically determine all the built-in search paths for the compiler.

The system may also automatically determine other configuration properties as well. For example, the system can maintain a list of command line flags and how those command line flags should be mapped to configuration commands of the compiler emulator.

The system caches the determined properties of the compiler (260). By caching the determined properties of the compiler, the system need not redetermine the configuration properties if the same compiler is encountered again during the build process.

The system uses the cached or determined configuration properties to configure the compiler emulator (270). After determining the compiler's built-in types, functions, macros, search paths, and other configuration properties, the compiler emulator will be able to very closely mimic the behavior of the compiler.

The system can provide the compiler emulator with numerous arguments, possibly hundreds or thousands, in order to configure the compiler emulator. Some arguments may specify the values of configuration properties directly, e.g., the size of a built-in type, the names of built-in macros, or the paths of built-in search paths. Other arguments may specify locations of files that include lists of values of configuration properties. For example, an argument can specify the location of a file that includes all of the built-in functions.

The system generates a source code representation using the configured compiler emulator (280). For static analysis applications, the compiler emulator can be configured to generate a rich abstract syntax tree that can be analyzed by a static analysis system.

Figure 3:
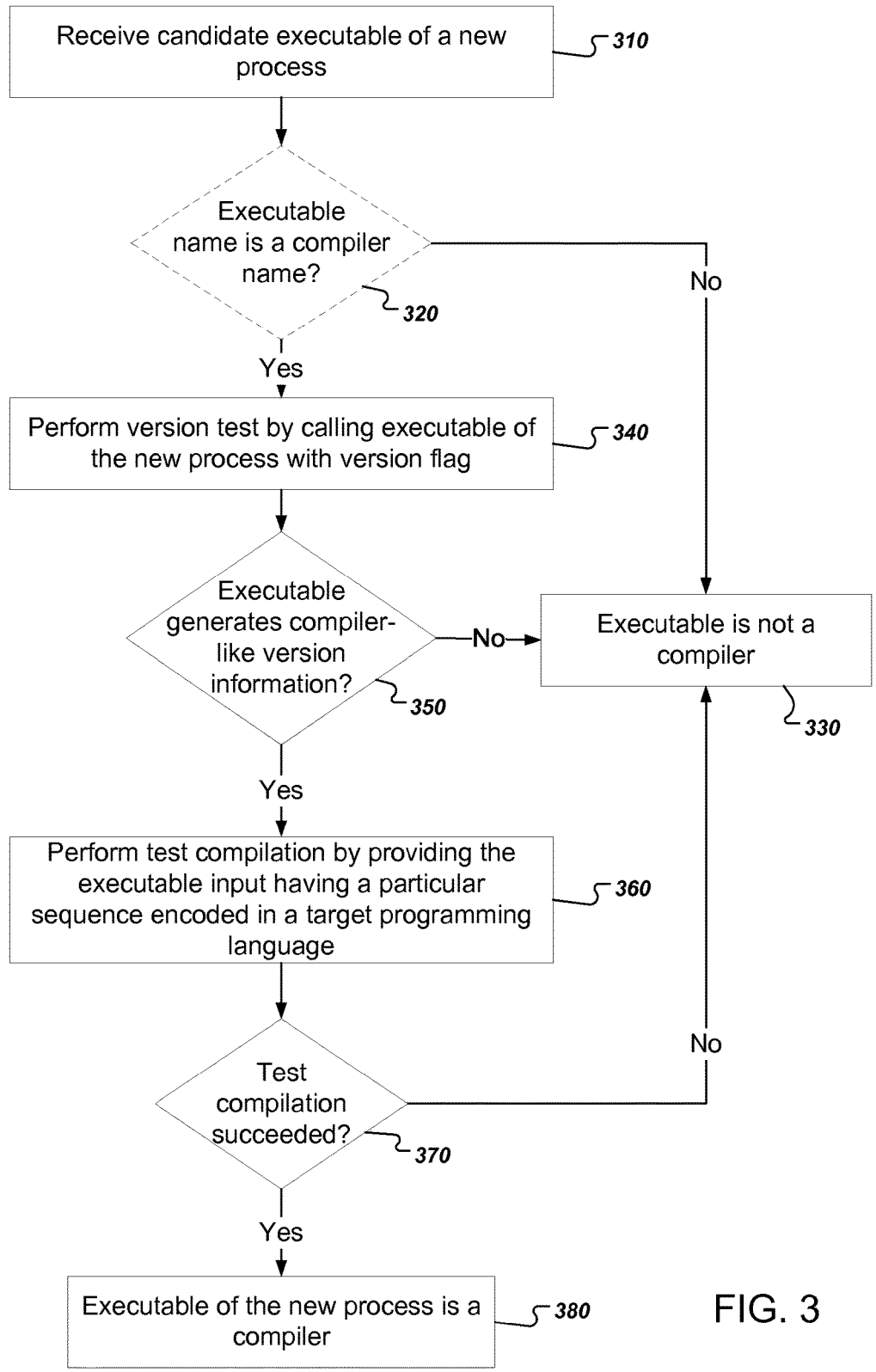
FIG. 3 is a flow chart of an example process for classifying an executable of a new process as a compiler or not a compiler.

FIG. 3 is a flow chart of an example process for classifying an executable of a new process as a compiler or not a compiler. In general, a static analysis system can determine whether the executable called for a new process is a compiler by performing a series of tests. The process will be described as being performed by an appropriately programmed system of one or more computers.

The system receives a candidate executable of a new process (310). As described above, a static analysis system can intercept all new processes and can inspect each new process to determine whether the executable used for the new process is a compiler.

In general, the system will invoke the executable of the new process in one or more additional processes and classify the executable as a compiler or not a compiler based on the behavior of the one or more additional processes.

Because the system intercepts all new processes, the system could enter an infinite series of process interceptions if care is not taken to avoid such a situation. To avoid entering such an infinite series, the system can set a classification environment variable indicating that classification for a particular executable is already in progress. The classification environment variable will signal to subsequently intercepted processes that they should not initiate compiler classification anew for the executable file. In some implementations, the classification environment variable includes the path of the executable file or a value derived from the path of the executable file, e.g., a hash value of the path of the executable file. Instead of an environment variable, the system can also use any appropriate method for storing an attribute that another process can read. For example, the system could store the value in a database or at a location on disk.

Then, when the system invokes new processes using the executable in order to perform the classification tests, the process preemption functions will check the classification environment variable for the executable file. If the environment variable is set, the process preemption function will not reinitiate classification for the executable file. Instead, the process preemption function will create a new process using a default create-process function.

The system can then clear the classification environment variable upon reaching a classification result for the executable file. In order to avoid duplicative classification results, in some implementations, the system can cache the results of the classification. In other words, if the executable has already been classified as a compiler or not a compiler, the system can reuse the results of the classification. In other words, the system need not re-perform all steps of a full compiler classification. However, some steps of the classification process may still be repeated for each invocation of the executable, which will be explained in more detail below with reference to FIG. 5.

The system optionally determines whether the executable name for the new process is a compiler name (320). In order to speed up the classification process, the system can maintain a whitelist of name patterns that match known compiler names, a blacklist of name patterns that match known non-compiler executable names, or both.

This optimization is optional because the names of processes that are compilers may be unknown for some build systems. For example, when classifying compilers in a legacy build system, the system can skip this step because the compiler names and the non-compiler executable names may not be known by administrators of the legacy build system.

TABLE 1 illustrates a few example patterns that match known compiler names on Windows and Linux.

TABLE 1

| WINDOWS COMPILER NAMES | LINUX COMPILER NAMES |
| --- | --- |
| **/cl.exe: | **/*clang*: |
| **/clang*.exe: | **/*cc*: |
| **/gcc*.exe: | **/*++*: |
| **/g++*.exe: | |
| **/*-clang.exe: | |
| **/*-gcc.exe: | |
| **/*-g++.exe: | |

If the name of the executable does not match any of the compiler names or patterns in the whitelist, the system determines that the candidate executable is not a compiler, bypassing any of the other compiler classification tests (branch to 330).

Similarly, the system can also maintain a blacklist of name patterns that are known non-compiler executables. For example, the system can add "yacc," the name of parser generator executable that would match the whitelist pattern **/*cc*, to the blacklist to avoid performing further classification tests when "yacc" is called by the build system during a build. Thus, if the name of the candidate executable matches a name or a pattern on the blacklist, the system determines that the candidate executable is not a compiler (branch to 330).

The static analysis system can perform the pattern matching of compiler names either by an intercept engine that is part of the static analysis system, e.g., the intercept engine 140 illustrated in FIG. 1. Alternatively, the static analysis system can perform the pattern matching directly in code of a custom create-process function on the build system, e.g., the customer create-process function 134 illustrated in FIG. 1.

When the system determines that the candidate executable is not a compiler, the static analysis system can then simply invoke the candidate executable as called so that interception of the new process is transparent to the build system.

If the candidate process name does match a compiler name or pattern, the system performs a version test by calling the executable of the new process with a version flag (branch to 340). Many compilers will generate a predictable output when invoked with a particular version flag, e.g., "--version" or "--help."

Thus, the system can invoke a new process using the executable of the new process by passing a "--version" flag as a command line argument to the new process.

The system then determines whether the executable generates compiler-like version information (350). TABLE 2 illustrates a few example outputs that are recognized as version information outputs of known compilers.

| OUTPUT CONTAINS | TENTATIVE COMPILER CLASSIFICATION |
| --- | --- |
| "Microsoft" and "Optimizing Compiler" and "C/C++" | cl.exe |
| "LLVM" and "clang" | clang |
| "gcc" or "g++" or "GCC" or "G++" | gcc or g++ |
| "(ICC)" and "Intel Corporation" | icc |

If the executable does not generate compiler-like version information, the system determines that the executable is not a compiler (branch to 330).

In some implementations, the system additionally imposes a time limit for the executable to produce the version information. For example, if the executable does not generate version information within 3, 10, or 30 seconds, the system can determine that the executable of the new process is not a compiler (branch to 330).

If the executable does generate compiler-like version information, the system can then determine whether the executable generates a predicted output when provided a predicted input. To do so, the system can perform a test compilation by providing the executable with an input having a particular sequence encoded for a target programming language (branch to 360). In some cases, the static analysis system may only be interested in intercepting compilers for a particular target programming language and disregarding compilers or interpreters or other executables called for other programming languages.

In other cases, the static analysis system can use the name of the compiler, the results of the version information, or both to determine a target programing language. For example, if both the name of the executable and the output of the version information indicates that the executable file is the gcc compiler, the system can designate C as the target programming language.

The input can be a source code file in the target programming language. The input source code file can include one or more segments of source code that encode, for the target programming language, a particular sequence of bytes. In other words, when a compiler for the target programming language compiles the encoded sequence of bytes, the compiler will generate an output file that includes the sequence of bytes. Thus, compilers of the target programming language will be likely to interpret the encoded sequence correctly, while other compilers and non-compiler processes will generate an error, generate an unpredicted output, or crash.

For example, for C compilers, the system can provide, as input to the executable, the following example input file that contains the following source code:

extern const volatile char* marker(void) {
    return "\x01S\x23"
       "E\x45M\x67M\x89L\xab"
       "E\xcd!\xef";
}

If the executable is actually a C compiler, C preprocessing will concatenate the three string literals in quotation marks to give a single string literal. The C compiler will also replace each four-byte hexadecimal subsequence "\x??" with a single byte whose hexadecimal value is equal to the values in "??". If the C compiler uses ASCII encoding, a C compiler that compiles the example source code above will generate the following sequence of bytes in its output: "01 53 23 45 45 4D 67 4D 89 76 AB 45 CD 21 EF 00."

The static analysis system can further increase its accuracy of classification by using input files that further differentiate compilers for the target programming language. For example, the system can use input files that include characters, keywords, or other lexical constructs that are valid in the target programming language but that are invalid or do not produce the predicted output for compilers of other programming languages or for other non-compiler executables.

For example, the example input file above has several features that differentiate between the behavior of C compilers and compilers of other programming languages and non-compiler executables.

First, the example input file includes adjacent string literals. C compilers perform concatenation of adjacent string literals at compile time, but compilers for most other programming languages do not and will likely produce errors rather than an output file. Furthermore, candidate executables that are merely file copying utilities may reproduce some of the sequence of bytes in the input file, but file copying utilities will not perform string concatenation like a C compiler. Therefore, if the executable is truly a C compiler, the adjacent string literals in the example input file will not cause the compiler to produce an error, and the output will contain the correctly concatenated sequence of bytes.

Second, the example input file includes escape sequences representing number values having a particular radix. In this example, the input file includes hexadecimal escape sequences, but the input file could also include octal, decimal, or any other appropriate escape sequences that are recognized by compilers for the target language. For example, C compilers recognize hexadecimal escape sequences, but many compilers for other programming languages do not. Similarly, file copying utilities generally do not recognize hexadecimal escape sequences. Therefore, the hexadecimal escape sequences in the example input file will not cause a C compiler to generate an error, but the escape sequences may cause other compilers to generate an error. Similarly, file copying utilities will not generate an output file having the target sequence because file copying utilities do not transform hexadecimal escape sequences like C compilers do.

Third, the example input file includes curly braces "{ }". Curly braces are allowed in C, but will produce errors in many other programming languages.

Fourth, the example input file includes "char*". This sequence of characters is a valid type definition in C. However, "char*" is not a valid construct in many other programming languages, including programming languages that do have "char" as a type. Thus, the system can include "char*" in the input file to distinguish between C compilers and some compilers of other programming languages.

Fifth, the example input file includes "const." In some programming languages, e.g., Java, "const" is recognized as a keyword, but any input files that include "const" as a keyword are rejected by the compiler. Thus, by including "const" in the input file, the system can distinguish between Java compilers and other compilers for the target programming language.

The system determines whether the test compilation succeeded (370). In general, the system can consider the test compilation to have succeeded if the executable did not generate errors during compilation and if the particular sequence occurs in the output. If the executable is a compiler for the target programming language, the executable will generate an output that includes the sequence that was encoded for the target programming language. For example, if the system uses the example input file above, a true C compiler would generate an output having the sequence "01 53 23 45 45 4D 67 4D 89 76 AB 45 CD 21 EF 00."

If the sequence occurs in the output, the system classifies the executable of the new process as a compiler (branch to 380). If not, the system classifies the executable of the new process as not a compiler.

Figure 4A:
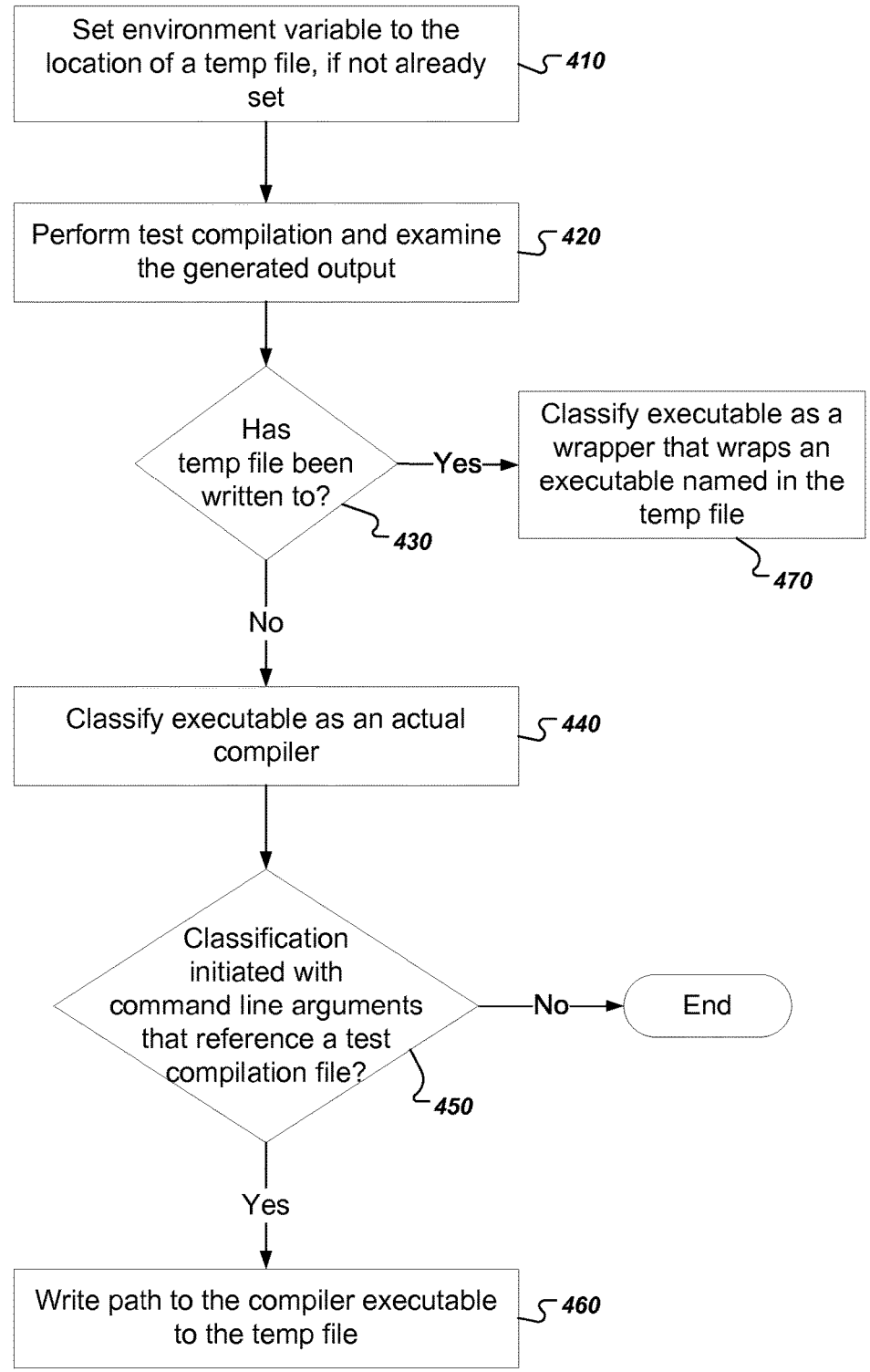
FIGS. 4A-B are flow charts for an example process for distinguishing wrappers from actual compilers.

FIG. 4A is a flow chart of an example process for distinguishing wrappers from actual compilers. Some non-compiler executables are merely thin wrappers that themselves call actual compilers but that behave like compilers in many ways. For example, when passed a source code file, the thin wrapper will generate a compiled object file just like a compiler. When passed a --version flag, the thin wrapper will generate version information just like a compiler.

However, a static analysis system may still want to distinguish between thin wrappers and actual compilers for a number of reasons. For one, if both a thin wrapper around a compiler and the compiler itself are classified as compilers, the compiler emulator will emulate two compilations even though only one occurred. Secondly, thin wrappers often add extra command line arguments before calling a compiler, which the compiler emulator should take into account to be as accurate as possible.

The process will typically be performed by multiple custom create-process functions that intercept calls in the build system, which can coordinate with one another to determine whether an executable is a compiler or just a thin wrapper around one.

For systems that distinguish between thin wrappers and compilers, the process in FIG. 4A can augment the classification process of FIG. 3, in particular, the operations of performing the test compilation and determining whether the test compilation succeeded (steps 360, 370, and 380). In other words, for brevity some steps of the classification process, e.g., examining the name of the executable file and performing the version test, are omitted in FIG. 4A.

The process illustrated in FIG. 4A will be invoked by multiple new processes during the course of determining that an executable is a thin wrapper. Thus, some of the operations below will be described as being performed during interception and classification of processes for the wrapper and others will be described as being performed during interception and classification of an actual compiler.

Figure 4B:
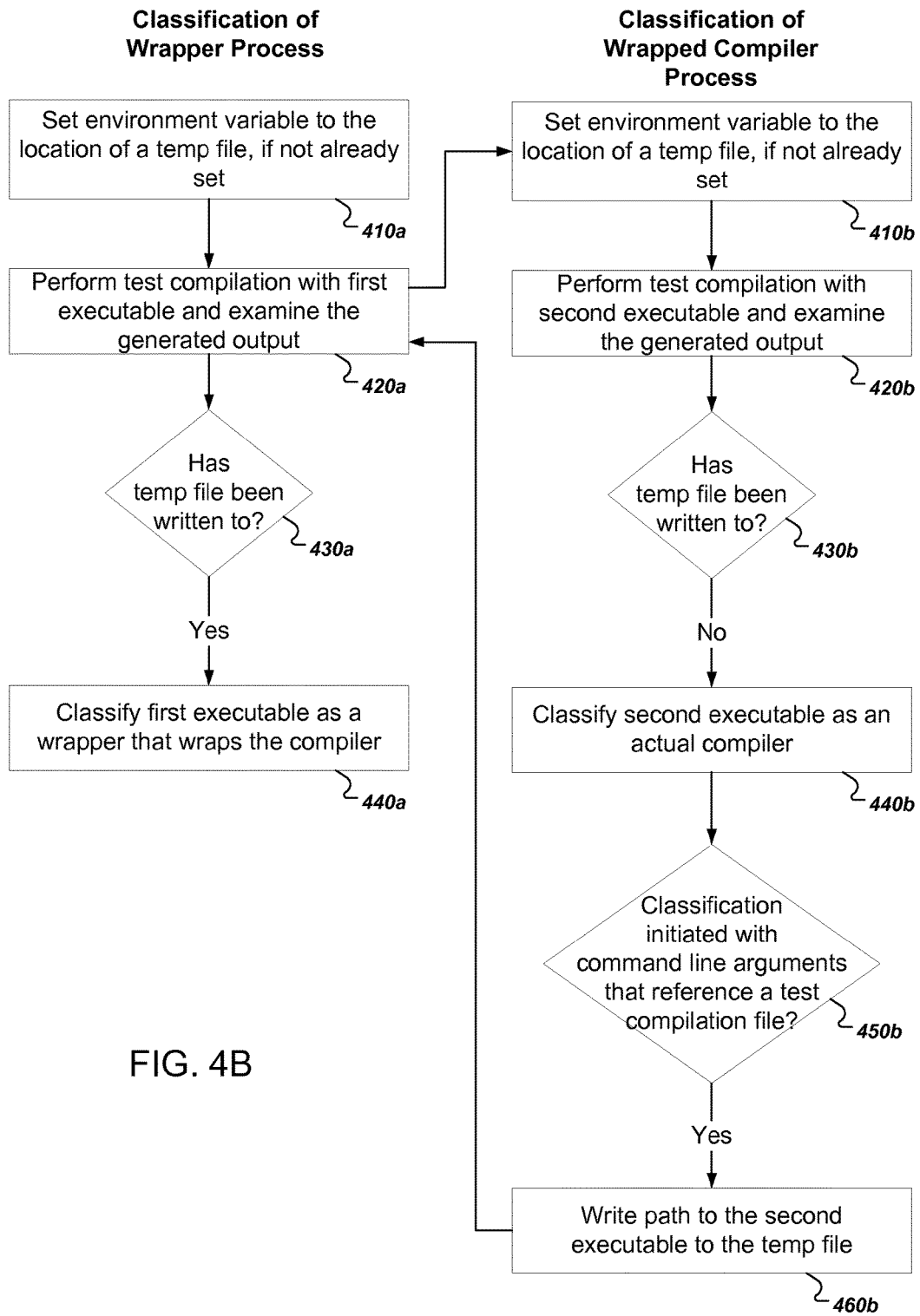

For added clarity, FIG. 4B is a flow chart showing which steps of FIG. 4A would be performed by classification processes for an example in which a wrapper executable wraps a compiler executable. Steps on the left of the flow chart are performed by the system during classification of the wrapper process, and steps on the right of the flow chart are performed by the system during classification of the wrapped compiler process.

Before performing the test compilation as described above with reference to step 350 of FIG. 3, the system sets an environment variable to the location of a temporary file (410a as performed during classification of the wrapper process). The system will use the temporary file to record an indication that a pattern of process calls reveals that a particular executable is merely a thin wrapper around an actual compiler.

The environment variable need not be specific to the name of the executable file being classified. Thus, the system can use any appropriate mechanism for new processes to access attribute values. For example, instead of using a location of temporary file, the system can use a record in a database.

The system performs a test compilation on the first executable (420a as performed during classification of the wrapper process). As described above with reference to step 360 of FIG. 3, the system can provide an input file to the executable being classified and then examine the output generated by the input file.

If the executable file is a thin wrapper around a compiler, the test compilation will result in a new process being invoked with the input file being passed as an argument to an actual compiler. The path to the actual compiler will be different than the path of the wrapper, and therefore the classification environment variable as described above will not prevent the system from initiating a new classification process on the actual compiler.

However, the system may have already classified the actual compiler and cached the results, in which case the system need not reclassify the actual compiler. In particular, during the version test of the wrapper, as described above with reference to step 340 of FIG. 3, the call to the wrapper with the version flag will also result in a call to the actual compiler with the version flag. During that call, the system may perform the initial classification of the actual compiler and cache the results.

Thus, if the first executable is a wrapper, the process branches to step 410b due to the system intercepting the wrapper's call to the compiler during the test compilation for the wrapper. Thus, the system sets the environment variable to the location of the temporary file, if not already set (410b as performed during classification of the wrapped compiler process).

If the results of the classification for the compiler are cached, the system can skip the test compilation. Otherwise, the system performs the test compilation with the second executable (420b as performed during classification of the wrapped compiler process), resulting in yet another new invocation of the compiler executable. However, because of the classification environment variable, the system will not reinitiate classification of the compiler process.

As mentioned briefly above, some parts of the compiler classification process are not cached. In particular, regardless of whether or not the classification of the actual compiler is cached, the operations of FIG. 4B will resume with the system determining whether the temporary file has been written to (430b as performed during classification of the wrapped compiler process).

When encountered during classification of the wrapped compiler process, the system will not have written anything to the temporary file. Thus, the system classifies the second executable as an actual compiler (branch to 440b as performed during classification of the wrapped compiler process).

The system can then record an indication, in the temporary file, that any wrapper that happened to call the actual compiler during a test compilation of its classification process is a wrapper and not a compiler. To do so, the system can write the path to the classified compiler to the temporary file.

But first, the system determines whether the classification process for the wrapped compiler was initiated with command line arguments that reference a test compilation file (450b as performed during classification of the wrapped compiler process). The reason for this determination is that some actual compilers invoke other actual compilers. Compilers may do this to discover their own built-in include search paths. Thus, the system only writes the indication to the temporary file if the classification process for the wrapped compiler was initiated with a reference to one of the test compilation files.

Thus, if the classification process for the wrapped compiler was initiated with command line arguments that reference a test compilation file, the system writes a path to the compiler executable in the temporary file (460b as performed during classification of the wrapped compiler process). Otherwise, the process returns to the classification process for the wrapper process (420a as performed during classification of the wrapper process).

The system examines the output generated during the test compilation for the wrapper process (420a as performed during classification of the wrapper process). If the wrapper is a thin wrapper around a compiler, it is likely that the wrapper process will pass the test compilation.

The system then determines whether the temporary file has been written to (430a as performed during classification of the wrapper process). The temporary file will have been written to as a result of the intervening classification of the compiler process, which was a process invoked during the test compilation of the wrapper.

Thus, the system classifies the first executable as a wrapper that wraps an executable named in the temporary file (branch to 470 as performed by the wrapper process). In other words, the system determines that the executable is not a compiler, but rather a wrapper around another executable.

The examples that follow illustrate the process calls that are invoked under various scenarios.

The following example illustrates classification of a compiler invoked during a build of the executable myexe as defined by code in the following example Makefile:
myexe: main.c
   gcc -o myexe main.c In this first example, it is assumed that the build command, e.g. the build command 115 in FIG. 1, is "make," that "gcc" is a compiler, and that "gcc" does its compilation work via three subprocesses: "cpp," "cc1," and "ld." These subprocesses are respectively a C preprocessor, a C compiler, and a linker. These subprocesses are chained together via temporary files in that order. The normal behavior of the build would proceed as follows:
01. Start of 'make'
|02. Start of 'gcc -o myexe main.c'
||03. Start of 'cpp -o tmp1 main.c' (because 'gcc' invokes 'cpp')
||04. End of 'cpp -o tmp1 main.c'
||05. Start of 'cc1 -o tmp2 tmp1' (because 'gcc' then invokes 'cc1')
||06. End of 'cc1 -o tmp2 tmp1'
||07. Start of 'ld -o myexe tmp2' (because 'gcc' finally invokes 'ld')
||08. End of 'ld -o myexe tmp2'
|09. End of 'gcc -o myexe main.c'
10. End of 'make'

In the next example, it is assumed that the compiler classifier, e.g., the compiler classifier 150 in FIG. 1 is an executable named "classify." It is further assumed that a custom create-process function, e.g., the custom create-process function 134 in FIG. 1, causes "classify X . . . ", where "X" represents an executable matching the whitelist pattern *cc*, to run and finish after "X . . . " runs and finishes. The behavior of the build then becomes:
01. Start of 'make'
|02. Start of 'gcc -o myexe main.c'
||03. Start of 'cpp -o tmp1 main.c'
||04. End of 'cpp -o tmp1 main.c'
||05. Start of 'cc1 -o tmp2 tmp1'
||06. End of 'cc1 -o tmp2 tmp1'
||07. Start of 'classify cc1 -o tmp2 tmp1' (because 134) (this sets an environment variable preventing further classification of 'cc1')
|||08. Start of 'cc1 --version'
|||09. End of 'cc1 --version'
|||10. Start of 'classify cc1 --version' (because 134)
|||11. End of 'classify cc1 --version' (found environment variable preventing further attempts at classification of 'cc1', no further process launches required)
|||12. End of 'classify cc1 -o tmp2 tmp1' (having classified 'cc1' as not-compiler, because it failed the --version test) (this clears the environment variable preventing further classification of 'cc1')
||13. Start of 'ld -o myexe tmp2'
||14. End of 'ld -o myexe tmp2'
|15. End of 'gcc -o myexe main.c'
||16. Start of 'classify gcc -o myexe main.c' (because 134) (this sets an environment variable preventing further classification of 'gcc')
|||17. Start of 'gcc --version'
|||18. End of 'gcc --version'
|||19. Start of 'classify gcc --version' (because 134)
|||20. End of 'classify gcc --version' (found environment variable preventing further attempts at classification of 'gcc', no further process launches required)
||21. Start of 'gcc semmle-test-input.c'
||22. Start of ' cpp -o tmp1 semmle-test-input.c'
|||23. End of 'cpp -o tmp1 semmle-test-input.c'
||24. Start of 'cc1 -o tmp2 tmp1'
||25. End of 'cc1 -o tmp2 tmp1'
||26. Start of 'classify cc1 -o tmp2 tmp1' (because 134)
||27. End of 'classify cc1 -o tmp2 tmp1' (got cached result of not-compiler from step 12, no further process launches required)
||28. Start of 'ld -o a.out tmp2'
|||29. End of 'ld -o a.out tmp2'

||30. End of 'gcc semmle-test-input.c'
||31. Start of 'classify gcc semmle-test-input.c' (because 134)
||32. End of 'classify gcc semmle-test-input.c' (same reason as step 20)
|33. End of 'classify gcc -o myexe main.c' (having classified 'gcc' as compiler, because it passed the --version test and the compilation test) (this clears the environment variable preventing further classification of 'gcc')
34. End of 'make'

As seen in the above, all of the steps of the normal build still happen, and the system has classified "gcc" as being a compiler.

In the next example, the system classifies an executable as a wrapper around a compiler. In this example, an executable "myexe" is built from code in the following example Makefile:

myexe: main.c
    gccwrap -o myexe main.c

This example also assumes that "gccwrap" is a program whose behavior is to add an extra command line argument to the invocation of "gcc." With this new Makefile, the normal behaviour of the build is:
01. Start of 'make'
|02. Start of 'gccwrap -o myexe main.c'
||03. Start of 'gcc -std=gnull -o myexe main.c'
|||04. Start of 'cpp -o tmp1 main.c'
|||05. End of 'cpp -o tmp1 main.c'
|||06. Start of 'cc1 -o tmp2 tmp1'
|||07. End of 'cc1 -o tmp2 tmp1'
|||08. Start of 'ld -o myexe tmp2'
|||09. End of 'ld -o myexe tmp2'
||10. End of 'gcc -std=gnull -o myexe main.c'
|11. End of 'gccwrap -o myexe main.c'
12. End of 'make'

Correspondingly, the behaviour with custom create-process 134 is:
01. Start of 'make'
|02. Start of 'gccwrap -o myexe main.c'
||03. Start of 'gcc -std=gnull -o myexe main.c'
|||04. Start of 'cpp -o tmp1 main.c'
|||05. End of 'cpp -o tmp1 main.c'
|||06. Start of 'cc1 -o tmp2 tmp1'
|||07. End of 'cc1 -o tmp2 tmp1'
|||08. Start of 'classify cc1 -o tmp2 tmp1' (because 134) (this sets an environment variable preventing further classification of 'cc1') (this sets an environment variable containing the name of a temporary file)
||||09. Start of 'cc1 --version'
||||10. End of 'cc1 --version'
||||11. Start of 'classify cc1 --version' (because 134)
||||12. End of 'classify cc1 --version' (found environment variable preventing further attempts at classification of 'cc1', no further process launches required)
|||13. End of 'classify cc1 -o tmp2 tmp1' (having classified 'cc1' as not-compiler, because it failed the --version test) (this clears the environment variable preventing further classification of 'cc1') (this clears the environment variable containing the name of a temporary file, and deletes the temporary file)
|||14. Start of 'ld -o myexe tmp2'
|||15. End of 'ld -o myexe tmp2'
||16. End of 'gcc -std=gnull -o myexe main.c'
||17. Start of 'classify gcc -std=gnull -o myexe main.c' (because 134) (this sets an environment variable preventing further classification of 'gcc') (this sets an environment variable containing the name of a temporary file)
|||18. Start of 'gcc --version'
|||19. End of 'gcc --version'
|||20. Start of 'classify gcc --version' (because 134)
|||21. End of 'classify gcc --version' (found environment variable preventing further attempts at classification of 'gcc', no further process launches required)
|||22. Start of 'gcc semmle-test-input.c'
|||23. Start of 'cpp -o tmp1 semmle-test-input.c'
|||24. End of 'cpp -o tmp1 semmle-test-input.c'
|||25. Start of 'cc1 -o tmp2 tmp1'
|||26. End of 'cc1 -o tmp2 tmp1'
|||27. Start of 'classify cc1 -o tmp2 tmp1' (because 134)
|||28. End of 'classify cc1 -o tmp2 tmp1' (got cached result of not-compiler from step 13, no further process launches required)
|||29. Start of 'ld -o a.out tmp2'
|||30. End of 'ld -o a.out tmp2'
|||31. End of 'gcc semmle-test-input.c'
|||32. Start of 'classify gcc semmle-test-input.c' (because 134)
|||33. End of 'classify gcc semmle-test-input.c' (same reason as step 21)
||34. End of 'classify gcc -std=gnull -o myexe main.c' (having classified 'gcc' as compiler, because it passed the --version test and the compilation test) (this clears the environment variable preventing further classification of 'gcc') (this clears the environment variable containing the name of a temporary file, and deletes the temporary file)
|35. End of 'gccwrap -o myexe main.c'
|36. Start of 'classify gccwrap -o myexe main.c' (because 134) (this sets an environment variable preventing further classification of ' gccwrap') (this sets an environment variable containing the name of a temporary file)
||37. Start of 'gccwrap --version'
||38. Start of 'gcc --version'
||39. End of 'gcc --version'
||40. Start of 'classify gcc --version' (because 134)
||41. End of 'classify gcc --version' (got cached result of compiler from step 34, no further process launches required
||42. End of 'gccwrap --version'
||43. Start of 'classify gccwrap --version' (because 134)
||44. End of 'classify gccwrap --version' (found environment variable preventing further attempts at classification of 'gccwrap', no further process launches required)
||45. Start of 'gccwrap semmle-test-input.c'
||46. Start of 'gcc semmle-test-input.c'
|||47. Start of 'cpp -o tmp1 semmle-test-input.c'
|||48. End of 'cpp -o tmp1 semmle-test-input.c'
|||49. Start of 'cc1 -o tmp2 tmp1'
|||50. End of 'cc1 -o tmp2 tmp1'
|||51. Start of 'classify cc1 -o tmp2 tmp1' (because 134)
|||52. End of 'classify cc1 -o tmp2 tmp1' (same reason as step 28)
|||53. Start of 'ld -o a.out tmp2'
|||54. End of 'ld -o a.out tmp2'
||55. End of 'gcc semmle-test-input.c'
||56. Start of 'classify gcc semmle-test-input.c' (because 134)
||57. End of 'classify gcc semmle-test-input.c' (same reason as step 41) (this writes 'gcc' to the temporary file named by an enivonment variable)
|58. End of 'gccwrap semmle-test-input.c'
|59. Start of 'classify gccwrap semmle-test-input.c' (because 134)
|60. End of 'classify gccwrap semmle-test-input.c' (same reason as step 44)

61. End of 'classify gccwrap -o myexe main.c' (having classified gccwrap as a wrapper, because it passed both tests, but the temporary file named by the environment variable was written-to at step 57) (this clears the environment variable preventing further classification of 'gccwrap') (this clears the environment variable containing the name of a temporary file, and deletes the temporary file)

62. End of 'make'

As seen in the above, in this example the system classifies 'gcc' as a compiler, and 'gccwrap' as a compiler wrapper.

Figure 5:
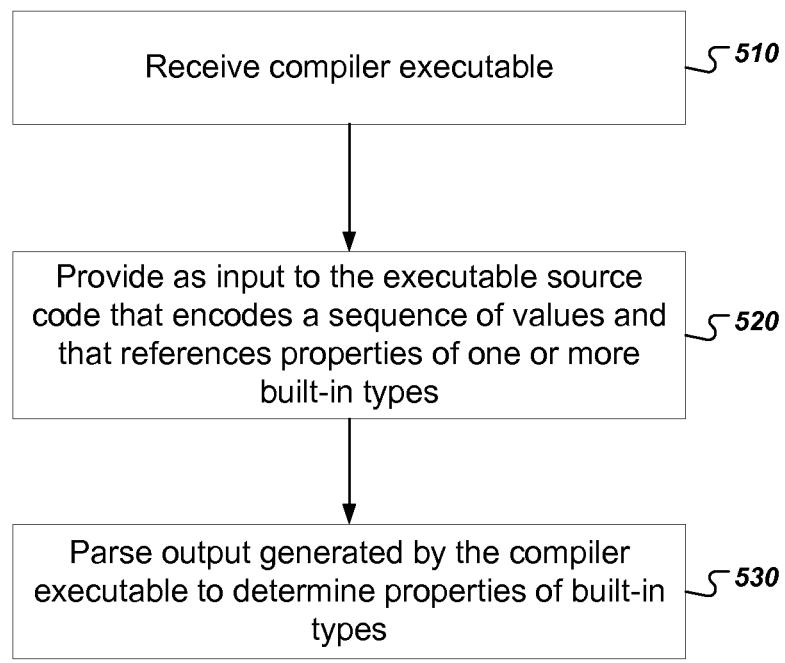
FIG. 5 is a flow chart of an example process for determining properties of built in types of a compiler.

FIG. 5 is a flow chart of an example process for determining properties of built-in types of a compiler. Some programming language specifications, e.g., C and C++, specify that types must exist, but the specification does not define some properties of the types. For example, the size of the "long" type and the size of a void function pointer can vary from compiler to compiler. Thus, system can examine output generated by a compiler executable to automatically determine the properties of the built-in types. The process will be described as being performed by an appropriately programmed system of one or more computers, e.g., the configuration engine 160 of FIG. 1.

The system receives a compiler executable (510). The compiler executable may be an executable that the system has newly classified as a compiler.

The system provides, as input to the executable, source code that encodes a sequence of values that references properties of one or more built-in types (520). For example, the system can use the following example source code file and provide the example source code file as input to the compiler executable:

extern const char dummy[ ]={
'F', 'D', 'A', 'B', '0', 'D', '2', '8', '6', '8', '5', '5', '4', 'E', 'F', '6',
'9', '5', '6', '0', '0', 'B', 'F', '5', 'D', 'E', '6', '2', '9', '7', '6', '2',
(char)(unsigned char)sizeof(long),
(char)(unsigned char)sizeof(void*)};

The example source code file defines a 34-byte array in C. The first 32 bytes of the array encode a sequence of values which, in this example, are alphanumeric characters.

The example sequence also includes two further source code elements that the compiler evaluate to be values of built-in types. In particular, the last two bytes of the example array will evaluate to the size of the type "long" and the size of the type "void*", respectively.

The system can include, in the example array, any appropriate number of values for properties of built-in types. Typically, the size of "long" and the size of "void*" vary the most significantly across various C compilers. Other example built-in types that the system can determine include "alignof(X)," which reveals the alignment requirement for the type specified by "X," the size of other pointer types, e.g., the size of pointers to member functions, the signedness of the "char" type, and whether signed integers use one's complement or two's complement, to name just a few examples.

In the example source code above, the elements that encode values of the built-in types occur at the end of the sequence of values. However, in other implementations, the system can place these elements at any appropriate position in the sequence. In some implementations, the system generates a random or pseudorandom sequence of values and places the elements that evaluate to properties of the built-in types at predetermined locations relative to the random or pseudorandom sequence of values.

The system parses the output generated by the compiler executable to determine the properties of the built-in types (530). When processing source code from the example above, most compilers will generate an output in which the characters of the selected sequence occur adjacent to each other or separated by regular intervals of intervening bytes.

For example, the characters may occur in adjacent bytes in the output generated by the compiler executable. In this case, the elements that encode the properties of the built-in types will occur in the output in the two bytes immediately following the sequence in the output. The system can read these values to obtain the properties of the built-in types for the "long" and "void*" types.

The values in the sequence may also occur in the output separated by N bytes, where N is a positive integer. Thus, to find the sequence of values in the output, the system can select different values for N until it determines a value of N that reproduces the selected sequence of values. In this example, the values that encode the properties of the built-in types will occur in the output N bytes after the end of the sequence of alphanumeric characters and 2*N bytes after the sequence of alphanumeric characters, respectively.

Figure 6:
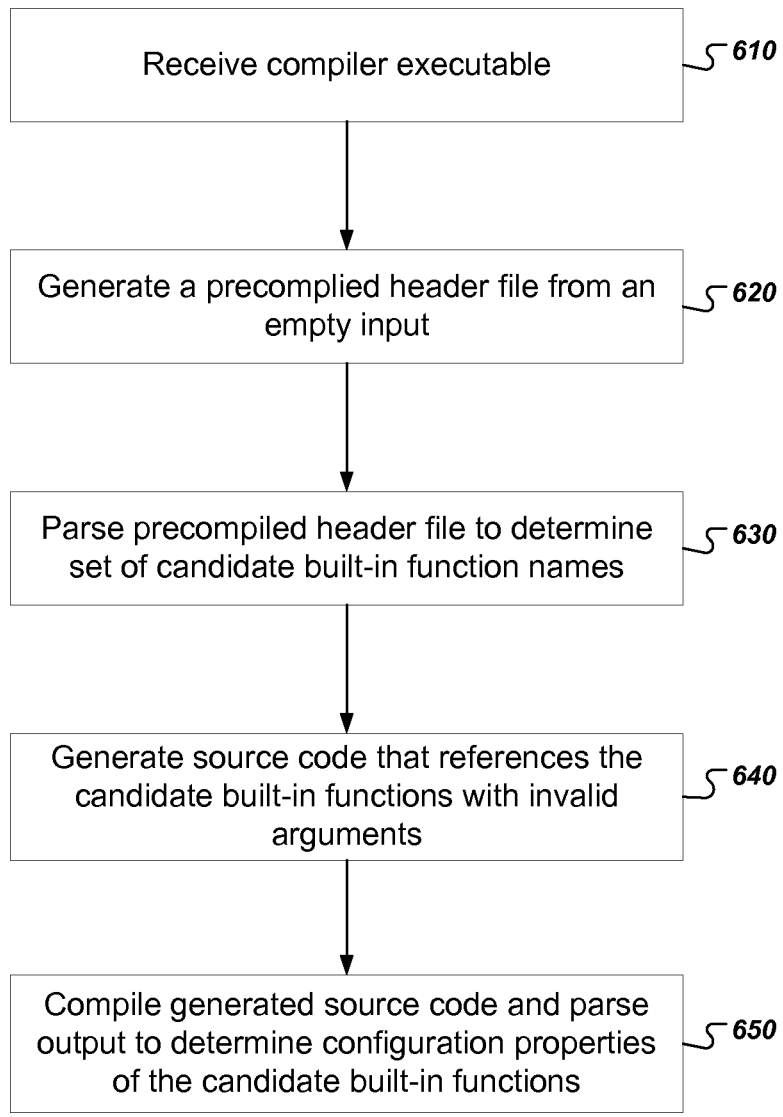
FIG. 6 is a flow chart of an example process for determining properties of built-in functions.

FIG. 6 is a flow chart of an example process for determining properties of built-in functions. The system can generate source code that intentionally misuses built-in functions. Doing so can cause the compiler to emit error messages that include information about the properties of the compiler's built-in functions. The process will be described as being performed by an appropriately programmed system of one or more computers, e.g., the configuration engine 160 of FIG. 1.

The system receives a compiler executable (610), e.g., an executable that the system has newly classified as compiler.

The system generates a precompiled header file from an empty input (620). For example, for GCC, the system can request that the compiler compile an empty header file, "empty.h," into the precompiled header file "empty.gch." By using an empty input, the precompiled header file will include all the symbol table information that the compiler adds to every program. This information will include a list of names that include the names of every built-in function. For some compilers, the system uses a file that includes "#pragma hdrstop" rather than an empty input to force the compiler to save the symbol table rather than discarding it.

The system parses the precompiled header file to determine a set of candidate built-in function names (630). In some implementations, the system parses the precompiled header file to identify reserved string patterns according to the corresponding programming language specification. For example, for C++ compilers, the system can parse the precompiled header file to identify all identifiers that begin with two underscore characters or an underscore and an uppercase letter. For example, an example precompiled header file can contain the following identifiers that being with two underscore characters:

_INTMAX_TYPE_
_builtin_ldexpf
_FLT_MAX_10_EXP_
_builtin_ia32_psraw
_extension_

The system can then discard identifiers of built-in macros. Determining built-in macros is described in more detail above with respect to step 256 of FIG. 2. In some implementations, the system discards identifiers that contain all upper case letters, which typically denote built-in macros. Thus, from the example input file, the system can discard both "_INTMAX_TYPE_" and "_FLT_MAX_10_EXP_".

The system may also maintain a list of identifiers that are known not to be built-in functions and discard, from the list of built-in functions, any of the identifiers on the list. For example, the system can maintain a list that identifies the "_extension_" identifier as actually being a keyword and not a built-in function.

The system may also test the length of the list to ensure that the automatic configuration produces a reasonable output. Some compilers have more than one thousand built-in functions. Thus, if for some reason the list of candidate built-in function is less than a particular threshold, e.g., less than 500, 100, or 50 functions, the system can abort the process and return an error indicating that the system was unable to determine the built-in functions for the compiler executable.

After having generated the list of built-in functions, the system can use the compiler executable to determine the return type and argument types for each of the built-in functions.

The system generates source code that references each of the determined candidate built-in functions with invalid arguments (640). By referencing the built-in functions with invalid arguments, the system can provoke the compiler executable to emit information about the argument types that the function expected and the return type of the function.

The system can generate two types of built-in function references: calls and redeclarations. A built-in function call invokes the function, whereas a built-in function redeclaration redeclares the built-in function.

To generate the source code, the system can use one or more template files and then fill in the name of each candidate built-in function. For example, for GCC, the system can use the following template file that is designed to call each built-in function:

struct X{ };
typedef struct X X;
line 1
int a_N(X x, . . . ){a_N(ID); ID(0,0,0,0,0,0,0,0,0,0);}

To generate the source code, the system can replace "ID" with the name of each built-in function. The template files can vary both by programming language and by the compiler being used.

For the clang compiler, the system can use the following example template file that is designed to redeclare each built-in function:

struct X{ };
typedef struct X X;
line 1
void a_N( ){X ID(X x);}

Regardless of the language or compiler being used, the template files generally have one or more of the following properties. The system may need to use template files having more or fewer of these properties depending on the compiler executable and the language being used.

First, the template file can reference the built-in function with a custom, explicitly defined type that the built-in function does not expect. In the examples above, the template files define a new type "struct X," which is a user-defined type. Because type-checking is typically done by checking type names, a user-defined type is a type that the built-in functions are very likely not to expect. By referencing the functions with this newly defined type, the compiler is likely to emit an error message about types that the built-in functions do expect.

Second, the template file can reference the built-in function with a number of arguments that is highly likely to be incorrect. For example, the line "ID(0,0,0,0,0,0,0,0,0,0);" in the first example file calls the built-in function with 10 arguments, which is highly likely to be an incorrect number of arguments for a built-in function. The system can use a predetermined threshold number of arguments, e.g., 10, 20, or 100. Thus, the compiler is likely to emit an error message about the number of arguments that the built-in function expects.

The system can also determine which built-in functions are variadic functions by using a relatively long list of arguments. Variadic functions are functions that accept a variable number of arguments. If a long list of arguments in a reference to a built-in function does not generate an error, the system can determine that the function is a variadic function. In order to avoid unhelpful type mismatch errors, the system can use, for each argument, a value that is likely to be valid for many types and likely to be valid for variadic functions. For example, the value 0 is likely to be valid for many types, including int, float, and pointers, and is likely to be valid for variadic functions.

Third, the template file can pass the function name as an argument to a function that expects an explicitly defined type. For example, in the first example template file, the code "a_N(ID)" passes the name of the function as an argument to a function that expects the explicitly defined new type "struct X." This reference to "ID" will be treated as an expression of a function pointer type, and the resulting error message will indicate that the function pointer type cannot be converted to a user-defined type. Typically, errors regarding function pointer types include the return type of the function as well as the argument types of the function.

The system compiles the generated source code and parses the output to determine configuration properties of the candidate built-in functions (650). Because the template files are designed to reference the built-in functions in invalid ways, a compiler is likely to emit error messages that include the configuration properties to be determined.

For example the G++ compiler emits the following error messages for the function _builtin_ldexpf:

"test.cpp:1:76: error: too many arguments to function 'float_builtin_ldexpf(float, int)'"

This error message includes both the return type of the built-in function, float, as well as information about how many arguments the function expects, two arguments, and the types of the arguments that the function expect, float and integer.

The system can thus parse the error messages generated by the compiler executable to automatically determine the configuration properties of all the built-in functions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a readonly memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments of the attached embodiments and the embodiments described above, the following embodiments are also innovative:

Embodiment 1 is a method for automatically determining configuration properties of a compiler executable invoked by a build system, the method comprising:

receiving an indication of a request by a build system to execute an executable in a first newly created process;

determining that the executable of the newly created process is a compiler called by the build system to compile source code of a source code file;

in response to the determining, determining a plurality of configuration properties of the compiler called by the build system, the configuration properties including first properties of a plurality of built-in functions of the compiler, second properties of a plurality of built-in types of the compiler, or both;

configuring a compiler emulator to emulate the behavior of the compiler called by the build system using the determined configuration properties; and providing access to the source code to the compiler emulator configured using the determined configuration properties, wherein the compiler emulator emulates the behavior of the compiler according to the determined configuration properties of the compiler called by the build system to generate a representation of the source code.

Embodiment 2 is method of embodiment 1, wherein determining that the executable of the newly created process is a compiler comprises:

obtaining a name of the executable for the first newly created process; and determining that the name of the executable matches one or more predetermined compiler names.

Embodiment 3 is the method of any one of embodiments 1-2, wherein determining that the executable of the newly created process is a compiler comprises:

performing a test classification process by providing a predetermined input to the executable to obtain an output generated by the executable; and determining that a predetermined predicted output occurs in the output generated by the executable.

Embodiment 4 is the method of embodiment 3, further comprising bypassing the test classification process for executables having names that do not match one or more predetermined compiler names.

Embodiment 5 is the method of any one of embodiments 1-4, wherein determining that the executable of the newly created process is a compiler comprises:

invoking the executable in a second newly created process and passing to the second newly created process, a segment of source code that encodes a predetermined sequence of bytes;

obtaining output generated by the second newly created process; and determining that the output generated by the executable in the second newly process includes the predetermined sequence of bytes.

Embodiment 6 is the method of embodiment 5, wherein the output is encoded as raw bytes rather than text.

Embodiment 7 is the method of any one of embodiments 1-6, further comprising automatically determining configuration properties for the plurality of built-in functions of the compiler, comprising:

obtaining a plurality of candidate built-in function names for the compiler;

generating source code that references one or more of the plurality of candidate built-in function names for the compiler;

invoking the executable in a second newly created process and passing, as a parameter to the second newly created process, the generated source code; and parsing errors generated by the executable in the second newly created process to obtain a plurality of configuration properties of the built-in functions for the compiler.

Embodiment 8 is the method of embodiment 7, wherein obtaining a plurality of candidate built-in function names comprises invoking the executable in the second newly-created process to generate a precompiled header file and obtaining the plurality of candidate built-in function names from the precompiled header file.

Embodiment 9 is method of any one of embodiments 7-8, wherein generating the source code comprises generating source code that references a candidate built-in function using a custom defined type as an argument to the candidate built-in function.

Embodiment 10 is the method of any one of embodiment 7-9, wherein generating the source code comprises generating source code that references a candidate built-in function with at least a threshold number of arguments that is likely to be incorrect.

Embodiment 11 is the method of embodiment 10, further comprising:

determining that a call with at least the threshold number of arguments to a candidate built-in function did not fail; and in response, classifying the candidate built-in function as a variadic function that accepts a variable number of arguments.

Embodiment 12 is the method of any one of embodiments 7-12, wherein generating the source code comprises generating source code that passes each of the candidate built-in function names as an argument to a respective instance of a function call that expects a custom, explicitly defined type.

Embodiment 13 is the method of any one of embodiments 1-12, wherein automatically generating configuration properties of the plurality of built-in types for the compiler comprises:

invoking the executable in a second newly created process and passing, to the second newly created process, source code that encodes a predetermined sequence of values and, at respective positions relative to the predetermined sequence of values, one or more source code elements that evaluate to properties of respective built-in types;

obtaining output generated by the second newly created process;

determining respective properties of the one or more built-in types from values occurring at the respective positions relative to the predetermined sequence of values.

Embodiment 14 is the method of embodiment 13, further comprising generating the source code to include the source code elements occurring adjacent to the predetermined sequence of bytes in the source code.

Embodiment 15 is the method of any one of embodiments 13-14, wherein determining the respective properties of the one or more built-in types comprises:

determining a regular interval at which each value of the sequence of values occurs in the output; and obtaining the respective properties from one or more values occurring in the output according to the regular interval.

Embodiment 16 is a method comprising:

receiving a plurality of newly created processes corresponding respectively to a plurality of executable files, each newly created process being a request to execute a corresponding executable file of the plurality of executable files;

providing, as input to each executable file, an input file that encodes a sequence of bytes for a particular target programming language;

determining, from the one or more output files generated by the executable files, which of the executable files generated an output having the sequence of bytes; and classifying only executable files that generated an output having the sequence of bytes as compilers for the target programming language.

Embodiment 17 is the method of embodiment 16, further comprising classifying other executable files that generated an error or did not generate an output having the sequence of bytes as not compilers for the target programming language.

Embodiment 18 is the method of any one of embodiments 16-17, wherein providing the input file comprises providing an input file that is valid in the target programming language but invalid in one or more other programming languages.

Embodiment 19 is the method of any one of embodiments 16-18, wherein the input file includes one or more characters, keywords, or lexical constructs that are valid in the target programming language but invalid in one or more other programming languages.

Embodiment 20 is method of any one of embodiments claim 16-19, wherein the sequence of bytes is encoded by a plurality of escape sequences representing number values having a particular radix.

Embodiment 21 is the method of any one of embodiments 16-20, wherein the sequence of bytes is encoded by a plurality of adjacent string literals.

Embodiment 22 is a method for classifying a first executable as a wrapper that wraps a compiler, the method comprising:

initiating a first classification process for a first executable, wherein the first classification process performs a test compilation by invoking the first executable with a test compilation file;

determining, by a second classification process, that the second classification process was invoked with a reference to the test compilation file;

in response, recording an indication that the second classification process was invoked with a reference to the test compilation file;

determining, by the first classification process, that the second classification process recorded the indication; and in response, classifying the first executable as a wrapper that wraps a compiler.

Embodiment 23 is the method of embodiment 22, further comprising:

determining, by the second classification process, that no third classification process recorded an indication that the third classification process was invoked during a test compilation of the second classification process; and in response, classifying the second executable as a compiler.

Embodiment 24 is the method of any one of embodiments 22-23, further comprising:

intercepting a request to execute a second executable in a second newly created process invoked during the test compilation of the first classification process;

initiating the second classification process for the second executable including invoking the second executable with the test compilation file.

Embodiment 25 is the method of any one of embodiments 22-24, wherein recording the indication comprises writing an indication to a data store.

Embodiment 26 is the method of any one of embodiments 22-25, wherein recording the indication comprises writing a path to the second executable in the data store.

Embodiment 27 is a method for classifying an executable as either a wrapper executable that wraps a wrapped subject executable or the wrapped subject executable, the method comprising:

initiating a first classification process for the first executable, wherein the classification process performs a test process by providing a test input to the first executable;

determining, by a second classification process, that the second classification process was invoked with a reference to a test input;

in response, recording an indication that the second classification process was invoked with the reference to the test input;

determining, by the first classification process, that the second classification process recorded the indication; and in response, classifying the first executable as a wrapper executable that wraps the second executable.

Embodiment 28 is the method of embodiment 27, further comprising:

determining, by the second classification process, that no third classification process recorded an indication that the third classification process was invoked during a test compilation of the second classification process; and in response, classifying the second executable as a wrapped subject executable.

Embodiment 29 is the method of any one of embodiments 27-28, further comprising:

intercepting a request to execute a second executable in a second newly created process invoked during the test process performed by the first classification process;

initiating the second classification process for the second executable including invoking the second executable with the test input.

Embodiment 30 is the method of any one of embodiments 27-29, wherein recording the indication comprises writing an indication to a data store.

Embodiment 31 is the method of any one of embodiments 27-30, wherein recording the indication comprises writing a path to the second executable in the data store.

Embodiment 32 is a system comprising: one or more computers and one or more storage devices storing instructions that are operable, when executed by the one or more computers, to cause the one or more computers to perform the method of any one of embodiments 1 to 31.

Embodiment 33 is a computer storage medium encoded with a computer program, the program comprising instructions that are operable, when executed by data processing apparatus, to cause the data processing apparatus to perform the method of any one of embodiments 1 to 31.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   initiating a first classification process for a first executable, wherein the first classification process performs a test compilation by invoking the first executable with a test compilation file;
   intercepting a request to execute a second executable in a second newly created process invoked due to the test compilation being performed by the first classification process;
   initiating a second classification process for the second executable including invoking the second executable with the test compilation file;
   determining, by the second classification process for the second executable, that no other classification process recorded an indication that another classification process was invoked during a test compilation performed by the second classification process;
   in response, classifying the second executable as a compiler;
   determining, by the second classification process, that the second classification process was invoked with a reference to the test compilation file;
   in response, recording an indication that the second classification process was invoked with the reference to the test compilation file;
   determining, by the first classification process, that the second classification process recorded the indication; and
   in response, classifying the first executable as a wrapper that wraps the compiler.

2. The method of claim 1, wherein recording the indication comprises writing an indication to a data store.

3. The method of claim 2, wherein recording the indication comprises writing a path to a second executable in the data store.

4. The method claim 1, wherein initiating the first classification process for the first executable comprises intercepting a request to execute the first executable in a first newly created process.

5. A computer-implemented method comprising:
   initiating a first classification process for a first executable, wherein the first classification process performs a test process by providing a test input to the first executable;
   intercepting a request to execute a second executable in a second newly created process invoked due to the test process being performed by the first classification process;
   initiating a second classification process for the second executable including invoking the second executable with the test input;
   determining, by the second classification process, that no other classification process recorded an indication that another classification process was invoked during a test compilation performed by the second classification process;
   in response, classifying the second executable as a wrapped subject executable;
   determining, by the second classification process, that the second classification process was invoked with a reference to the test input;
   in response, recording an indication that the second classification process was invoked with the reference to the test input;
   determining, by the first classification process, that the second classification process recorded the indication; and
   in response, classifying the first executable as a wrapper executable that wraps the wrapped subject executable.

6. The method of claim 5, wherein recording the indication comprises writing an indication to a data store.

7. The method of claim 6, wherein recording the indication comprises writing a path to the wrapped subject executable in the data store.

8. The method of claim 5, wherein initiating the first classification process for the first executable comprises intercepting a request to execute the first executable in a first newly created process.

9. A system comprising:
   one or more computers and one or more storage devices storing instructions that are operable, when executed by the one or more computers, to cause the one or more computers to perform operations comprising:
   initiating a first classification process for a first executable, wherein the first classification process performs a test compilation by invoking the first executable with a test compilation file;
   intercepting a request to execute a second executable in a second newly created process invoked due to the test compilation being performed by the first classification process;
   initiating a second classification process for the second executable including invoking the second executable with the test compilation file;
   determining, by the second classification process for the second executable, that no other classification process recorded an indication that another classification process was invoked during a test compilation performed by the second classification process;

in response, classifying the second executable as a compiler;
determining, by the second classification process, that the second classification process was invoked with a reference to the test compilation file;
in response, recording an indication that the second classification process was invoked with the reference to the test compilation file;
determining, by the first classification process, that the second classification process recorded the indication; and
in response, classifying the first executable as a wrapper that wraps the compiler.

10. The system of claim 9, wherein recording the indication comprises writing an indication to a data store.

11. The system of claim 10, wherein recording the indication comprises writing a path to the second executable in the data store.

12. The system claim 9, wherein initiating the first classification process for the first executable comprises intercepting a request to execute the first executable in a first newly created process.

13. A system comprising:
one or more computers and one or more storage devices storing instructions that are operable, when executed by the one or more computers, to cause the one or more computers to perform operations comprising:
initiating a first classification process for a first executable, wherein the first classification process performs a test process by providing a test input to the first executable;
intercepting a request to execute a second executable in a second newly created process invoked due to the test process being performed by the first classification process;
initiating a second classification process for the second executable including invoking the second executable with the test input;
determining, by the second classification process, that no other classification process recorded an indication that another classification process was invoked during a test compilation performed by the second classification process;
in response, classifying the second executable as a wrapped subject executable;
determining, by the second classification process, that the second classification process was invoked with a reference to the test input;
in response, recording an indication that the second classification process was invoked with the reference to the test input;
determining, by the first classification process, that the second classification process recorded the indication; and
in response, classifying the first executable as a wrapper executable that wraps the wrapped subject executable.

14. The system of claim 13, wherein recording the indication comprises writing an indication to a data store.

15. The system of claim 14, wherein recording the indication comprises writing a path to the wrapped subject executable in the data store.

16. The system of claim 13, wherein initiating the first classification process for the first executable comprises intercepting a request to execute the first executable in a first newly created process.

17. A computer program product, encoded on one or more nontransitory computer storage media, comprising instructions that when executed by one or more computers cause the one or more computers to perform operations comprising:
initiating a first classification process for a first executable, wherein the first classification process performs a test compilation by invoking the first executable with a test compilation file;
intercepting a request to execute a second executable in a second newly created process invoked due to the test compilation being performed by the first classification process;
initiating a second classification process for the second executable including invoking the second executable with the test compilation file;
determining, by the second classification process for the second executable, that no other classification process recorded an indication that another classification process was invoked during a test compilation performed by the second classification process;
in response, classifying the second executable as a compiler;
determining, by the second classification process, that the second classification process was invoked with a reference to the test compilation file;
in response, recording an indication that the second classification process was invoked with the reference to the test compilation file;
determining, by the first classification process, that the second classification process recorded the indication; and
in response, classifying the first executable as a wrapper that wraps the compiler.

18. The computer program product of claim 17, wherein recording the indication comprises writing an indication to a data store.

19. The computer program product of claim 18, wherein recording the indication comprises writing a path to the second executable in the data store.

20. The computer program product claim 17, wherein initiating the first classification process for the first executable comprises intercepting a request to execute the first executable in a first newly created process.

21. A computer program product, encoded on one or more nontransitory computer storage media, comprising instructions that when executed by one or more computers cause the one or more computers to perform operations comprising:
initiating a first classification process for a first executable, wherein the first classification process performs a test process by providing a test input to the first executable;
intercepting a request to execute a second executable in a second newly created process invoked due to the test process being performed by the first classification process;
initiating a second classification process for the second executable including invoking the second executable with the test input;
determining, by the second classification process, that no other classification process recorded an indication that another classification process was invoked during a test compilation performed by the second classification process;
in response, classifying the second executable as a wrapped subject executable;

determining, by the second classification process, that the second classification process was invoked with a reference to the test input;

in response, recording an indication that the second classification process was invoked with the reference to the test input;

determining, by the first classification process, that the second classification process recorded the indication; and in response, classifying the first executable as a wrapper executable that wraps the wrapped subject executable.

22. The computer program product of claim 21, wherein recording the indication comprises writing an indication to a data store.

23. The computer program product of claim 22, wherein recording the indication comprises writing a path to the wrapped subject executable in the data store.

24. The computer program product of claim 21, wherein initiating the first classification process for the first executable comprises intercepting a request to execute the first executable in a first newly created process.

* * * * *

UNITED STATES PATENT AND TRADEMARK OFFICE
CERTIFICATE OF CORRECTION

PATENT NO. : 9,672,015 B2  
APPLICATION NO. : 14/869334  
DATED : June 6, 2017  
INVENTOR(S) : Peter Cawley It is certified that error appears in the above-identified patent and that said Letters Patent is hereby corrected as shown below:

In the Specification

Column 1, Line 9: delete "Of" and insert -- of --, therefor.

In the Claims

Column 28, Line 4, Claim 4: after "method" insert -- of --.

Column 29, Line 19, Claim 12: after "system" insert -- of --.

Column 29, Line 67, Claim 17: delete "nontransitory" and insert -- non-transitory --, therefor.

Column 30, Line 41, Claim 20: after "product" insert -- of --.

Column 30, Line 46, Claim 21: delete "nontransitory" and insert -- non-transitory --, therefor.

Signed and Sealed this  
Twenty-seventh Day of March, 2018

Andrei Iancu  
*Director of the United States Patent and Trademark Office*